No. 779,830. PATENTED JAN. 10, 1905.
M. M. ARTMAN.
TIRE COUPLING.
APPLICATION FILED JUNE 10, 1904.
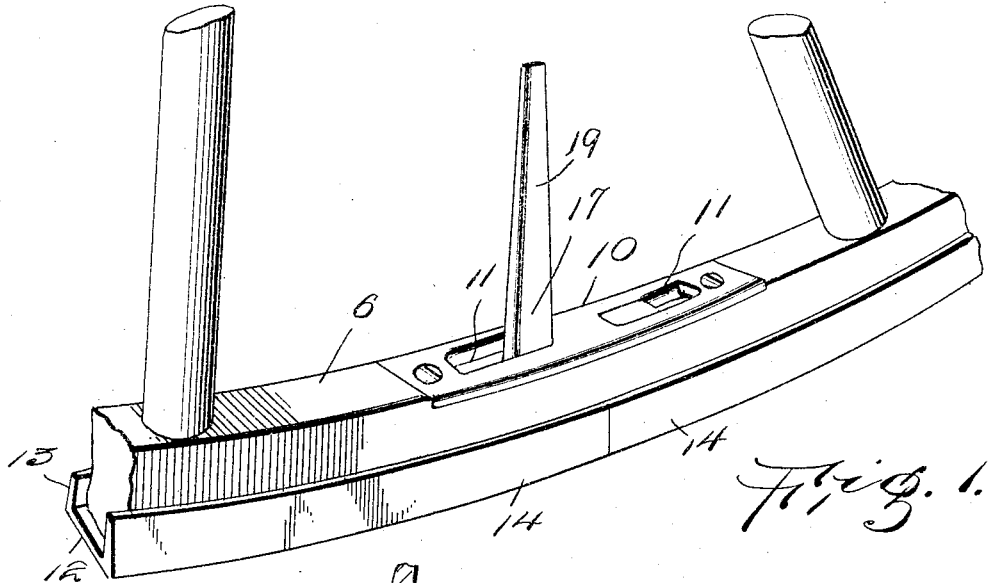
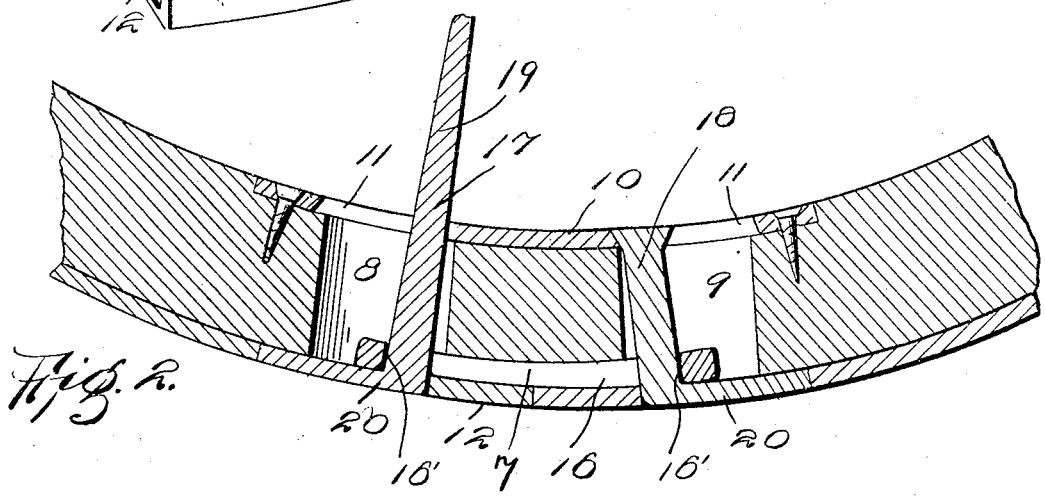
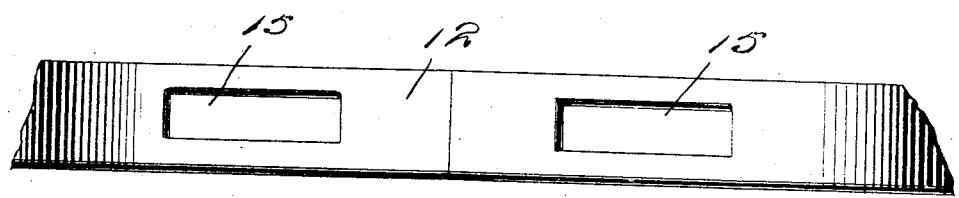
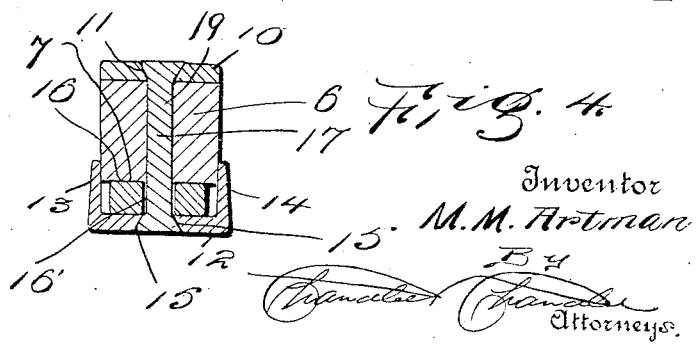
Witnesses
Inventor
M. M. Artman
Attorneys.

No. 779,830. Patented January 10, 1905.

UNITED STATES PATENT OFFICE.

MATHEW M. ARTMAN, OF MILLIGANTOWN, PENNSYLVANIA.

TIRE-COUPLING.

SPECIFICATION forming part of Letters Patent No. 779,830, dated January 10, 1905.

Application filed June 10, 1904. Serial No. 212,031.

*To all whom it may concern:*

Be it known that I, MATHEW M. ARTMAN, a citizen of the United States, residing at Milligantown, in the county of Westmoreland, State of Pennsylvania, have invented certain new and useful Improvements in Tire-Couplings; and I do hereby declare the following to be a full, clear, and exact description of the invention, such as will enable others skilled in the art to which it appertains to make and use the same.

This invention relates to tire-tighteners for vehicle-wheels, and has for its object to provide a construction in which the tire may be applied to the felly without heating, in which the accidental displacement of the tire will be rendered practically impossible, and in which the tire may be tightened at any time with little labor.

A further object is to provide a construction in which the tire will tend to materially strengthen the felly and prevent warping thereof.

In the drawings forming a portion of this specification, and in which like numerals of reference indicate similar parts in the several views, Figure 1 is a view of a wheel provided with the present invention. Fig. 2 is a longitudinal section of Fig. 1. Fig. 3 is a top plan view of the tire at the union of its ends. Fig. 4 is a transverse section through the felly.

Referring now to the drawings, there is shown a wheel including the felly 6, having a recess 7 in its outer periphery, and communicating with the recess adjacent to the ends thereof are a pair of passages 8 and 9, which also communicate with the inner periphery of the felly. Secured to the inner periphery of the felly is a plate 10, having dovetail slots 11 therein which register with the lower ends of the passages 8 and 9, the minor dimensions of the slots being at that face of the plate which lies against the felly.

In connection with the present invention a peculiar form of tire is used which consists of the tread 12, having flanges 13 and 14 at its edges, and the tire is disposed upon the felly with the flanges lying at opposite sides thereof. Adjacent to its ends the tire is provided with longitudinal slots 15, which lie above the passages 8 and 9, and between the tread 12 of the tire and the bottom of the recess 7 there is disposed an elongated link 16, which lies between the flanges 13 and 14 and with the ends of its opening 16' extending beyond the inner edges of the passages 8 and 9, the ends of the link lying above the passages.

A pair of keys 17 and 18 are provided, each of which includes a stem 19 and a laterally-extending head 20, the stem 19 being tapered away from the head, as shown. In securing the tire to the felly one of these keys is disposed with its stem engaged in each of the slots 15 and extending downwardly through the ends of the opening 16' of the link and into the passages 8 and 9. In this position the keys wedge between the ends of the slot 15 and the ends of the opening 16' and afterward are struck with a hammer or other heavy instrument to drive them into the openings and cause the heads 20 to fill the slots 15, this operation, as will be readily seen, forcing the free ends of the tire together and tightening it upon the felly. To prevent disengagement of the keys, the lower ends thereof, which project through the slots 11, are riveted over into these slots, the end of the key having been first cut off.

If at any time it is desired to tighten the tire, the riveted ends of the keys may be cut off by means of a cold-chisel inserted in the slots 11, and after withdrawal of the keys a portion of the tire may be cut off and larger keys inserted to draw the ends together, after which the riveting operation is repeated, as in the former instance.

In practice modifications of the specific construction shown may be made and any suitable materials and proportions may be used for the various parts without departing from the spirit of the invention.

What is claimed is—

1. In a tire-tightener, the combination with a felly having a recess in its outer periphery, and having passages communicating with the recess and its inner periphery, of a tire having slots therein disposed upon the felly with its slots lying above the passages, a link having a longitudinal opening disposed in the recess with the ends of its opening above the passages, and tapered keys engaged with the passages and the opening of the link and having heads lying in the slots of the tire.

2. In a tire-tightener, the combination with a felly having a recess in its outer periphery and having passages communicating with the recess and its inner periphery, of a tire having slots adjacent to its ends disposed upon the felly with its slots lying above the passages, a link disposed in the recess and having a longitudinal opening extending beyond the inner edges of the passages, a plate having longitudinal dovetail slots secured to the inner periphery of the felly with its slots in alinement with the passages, and tapered keys engaged with the opening of the link and the passages and extending into the slots of the plate, the outer ends of said keys having laterally-extending heads lying in the slots of the tire, and the inner ends thereof being riveted over into the dovetail slots.

In testimony whereof I affix my signature in presence of two witnesses.

MATHEW M. ARTMAN.

Witnesses:
A. H. SNYDER,
E. T. JONES.